(12) United States Patent
Joshi et al.

(10) Patent No.: US 7,516,397 B2
(45) Date of Patent: Apr. 7, 2009

(54) METHODS, APPARATUS AND COMPUTER PROGRAMS FOR CHARACTERIZING WEB RESOURCES

(75) Inventors: Sachindra Joshi, New Delhi (IN); Raghuram Krishnapuram, New Delhi (IN); Shourya Roy, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 347 days.

(21) Appl. No.: 10/901,275

(22) Filed: Jul. 28, 2004

(65) Prior Publication Data

US 2006/0026496 A1    Feb. 2, 2006

(51) Int. Cl.
G06F 17/00 (2006.01)
(52) U.S. Cl. .................. 715/206; 715/205; 715/204
(58) Field of Classification Search .............. 715/501.1, 715/513, 530, 206, 205, 204
See application file for complete search history.

(56) References Cited

U.S. PATENT DOCUMENTS

| | | | |
|---|---|---|---|
| 6,763,496 B1* | 7/2004 | Hennings et al. | 715/501.1 |
| 2003/0208482 A1* | 11/2003 | Kim et al. | 707/3 |
| 2004/0148173 A1* | 7/2004 | Wu | 704/270.1 |
| 2005/0149576 A1* | 7/2005 | Marmaros et al. | 707/200 |

OTHER PUBLICATIONS

Soumen Chakrabarti, Byron E. Dom and Piotr Indyk: Enhanced hypertext categorization using hyperlinks, In Proceedings of the ACM International Conference On Management of Data (ACM—Sigmod), pp. 307-318, Seattle, US, 1998.

Eric J Glover, Kostas Tsioutsiouliklis, Steve Lawrence, David M. Pennock and Gary W. Flake: "Using Web structure for classifying and describing Web pages", In Proceedings of the International World Wide Conference, Honolulu Hawaii, 2002.

Guiseppe Attardi, Antonio Gulli and Fabrizio Sebastiani: "Automatic Web page categorization by link and context analysis", In Proceedings of THAI—99, 1st European Symposium on Telematics, Hypermedia and Artificial Intelligence, pp. 105-119.

John M. Pierre, "Practical Issues for Automated Categorization of Web Sites", Sep. 2000. (downloaded on Feb. 17, 2004 from ww.ics. forth.gr/isl/SemWeb/proceedings/session3-3/html_version/ semanticweb.html).

* cited by examiner

*Primary Examiner*—Stephen S Hong
*Assistant Examiner*—Matthew J Ludwig
(74) *Attorney, Agent, or Firm*—Gibb I.P. Law Firm, LLC

(57) ABSTRACT

Methods, apparatus and computer programs are provided for characterizing Web-based information resources based on their interactions. A Web-based information resource is a single Web document or a collection of related Web documents. Unlike simple text documents, Web documents contain hyperlinks and other HTML tags. Different types of interactions, including inbound hyperlinks, outbound hyperlinks and internal links associated with a Web-based information resource, are used to characterize the Web-based information resource. A DOM tree representing the tag structure of a Web-based information resource is used to identify text items likely to be useful as context for a hyperlink anchor text, and the anchor text is combined with the context to generate a representation. The representation of Web-based information resources based on interactions can be used for clustering and classification, and in Web mining applications such as query disambiguation and automatic taxonomy generation.

16 Claims, 4 Drawing Sheets

METHODS, APPARATUS AND COMPUTER PROGRAMS FOR CHARACTERIZING WEB RESOURCES

FIELD OF INVENTION

The present invention relates to methods, apparatus and computer programs for characterizing resources, such as Web pages and Web sites, and uses of the characterizations for classification and data organization, clustering and retrieval, and for applications such as data mining of Web-based resources.

BACKGROUND

The tremendous growth of the Web (World Wide Web Internet service) over the past few years has made a vast amount of information available to users. However, the sheer scale of the Web has also posed several problems in organizing, retrieving and utilizing this information. Web Directories such as Yahoo!™, Lycos™ and Netscape's dmoz have been very useful for searching this vast amount of information. Directory based methods of searching on the Web can give better precision but a low recall when compared with search engines. One reason for low recall is that the directories are typically manually created and maintained. The human effort required for classifying material and maintaining the directories up-to-date cannot keep pace with the exponential growth of the Web. Therefore, automatic categorization of Web-based information resources into these directories is required. Consequently, several machine learning techniques have been applied to the task of categorization of Web sites. Web directories are also helpful in many other information retrieval applications such as information filtering and information extraction.

Several techniques have been developed to generate hierarchies from the search results returned by search engines. The generated hierarchies present an overview of the returned results and provide a mechanism to refine the search results. These techniques employ clustering algorithms to generate the hierarchies. Several other Web mining applications, such as query disambiguation, also require the clustering of Web documents.

Web mining applications typically represent Web documents in terms of certain features and then use machine learning techniques such as classification and clustering for further processing. Several approaches have used the text content of the Web documents for this classification, but text classifiers that perform quite well on simple text documents have been observed to perform poorly on Web documents. Web documents have structured information which is nested inside different HTML tags, and contain hyperlinks. These documents therefore have much more information than simple text documents. On the other hand, they also contain a lot of "noise" due to poor editing and spamming. Consequently, other features have been suggested for the purpose of classification and clustering of Web documents.

S. Chakrabarti et al, "Enhanced hypertext categorization using hyperlinks", Proceedings of the ACM International Conference On Management Of Data (*ACM-SIGMOD*), pages 307-318, Seattle, US, 1998, discloses the use of hyperlinks on a set of Web pages and US patent documents in which citations were considered as links. Texts from neighboring documents and system-predicted class categories (topics) for the neighboring documents were used for document classification. The 'neighbouring' documents were the documents having links to the document under consideration. Significant improvement was observed over a 'baseline' reference case that relied only on the text content of target documents. Chakrabarti et al also tested a more naive way of using the linked documents, treating the words in the linked documents as if they were local, but this approach increased the error rate over the baseline case.

E. J. Glover et al, "Using Web Structure for Classifying and Describing Web Pages", Proceedings of the International World Wide Web Conference (*WWW*2002), Honolulu, Hi, 2002, disclosed use of anchor text and text neighboring the anchor text for classifying a target document after performing entropy-based feature selection. The anchor text of a link is the displayed text between <A HREF="URL"> and </A> tags.

J. M. Pierre, "Practical Issues for Automated Categorization of Web Sites", September 2000, discloses the use of meta-tags appearing on Web pages for hypertext classification. Pierre suggests that meta-tags, whenever present, are more useful than the text content of the pages for classification. At the time of writing this patent specification, an online version of Pierre's paper is available from: www.ics.forth.gr/is1/SemWeb/proceedings/session3-3/html_version/semanticweb.html G. Attardi et al, in "Automatic Web Page Categorization by Link and Context Analysis", Proceedings of 1st European Symposium on Telematics, Hypermedia and Artificial Intelligence, 1999 (*THAI*-99), pages 105-119, propose an approach for document classification where a Web document is represented by the anchor text of the links that refer to the given document along with some contextual 'hints' extracted from the document that includes the link (hints such as page title, section title and list descriptions). The content of the Web document is ignored. Attardi et al report improved accuracy for classification of Web pages.

Although representation of documents using anchor text and some specific 'contextual' text has been proposed in the art, there remains a need for improved methods for characterizing and generating representations of Web-based information resources, such as for categorizing Web pages and for efficient information retrieval.

SUMMARY

A first embodiment of the present invention provides a method for generating a representation of a Web-based information resource based on interactions arising out of hyperlinks. The method includes identifying anchor text and related context for each of a set of hyperlinks associated with the Web-based information resource to characterize the interactions.

The set of hyperlinks used to generate a representation of the Web-based information resource may encompass a plurality of different types of interactions between and within Web-based information resources. The interaction types can be described based on the role of the resource in a particular interaction. In one embodiment, both inbound hyperlinks to the Web-based information resource and outbound hyperlinks from the Web-based information resource are used when constructing a representation of the resource. An inbound interaction refers to any inbound link to the Web-based information resource from another resource, and the set of inbound interactions represents the image of the Web-based information resource to the outside world. An outbound interaction refers to any of the outbound links and the set of outbound interactions comprises information representing other associated Web-based information resources.

In another embodiment, internal interactions are also used to construct the representation. An internal interaction refers to any of the internal links in the Web-based information resource and the set of internal interactions represents the type of information the Web-based information resource attempts to disseminate about itself.

The anchor text for each of the hyperlinks is associated with a node of a DOM tree that represents the structure of the Web-based information resource. A method according to one embodiment of the invention includes referring to the DOM tree representing the structure of the Web-based information resource to identify and extract text that is likely to be descriptive of the item linked to by the hyperlink.

In one embodiment, the DOM tree is used to identify sibling nodes and ancestor nodes for each of the hyperlink anchor texts, and a location-specific context is determined for each link's anchor text. The location-specific context comprises information relating to sibling nodes and ancestor nodes within the DOM tree, such as text extracted from each previous sibling and text extracted from the parent node of the anchor text. The anchor text is combined with the respective location-specific context for each of the set of hyperlinks, to generate an interaction-based representation of the Web-based information resource.

Given a DOM tree that represents the structure of the Web-based information resource, if the anchor text of a hyperlink is associated with a current node of the DOM tree, the location-specific context may be text associated with a set of previous siblings and ancestor nodes of the current node. In one embodiment, the DOM tree is used to identify a set of nodes comprising the current node's previous siblings (siblings to the left of and above the current node in the DOM tree) and ancestor nodes as well as siblings of the ancestor nodes. The set of ancestors may include the root of the DOM tree at the top of a Web page. Text associated with the identified siblings, ancestors and siblings of ancestors is then extracted to form the location-specific context for a hyperlink. The location-specific context is combined with the hyperlink's anchor text, for each hyperlink within the Web-based information resource, to provide a rich representation of the resource.

The set of nodes of the DOM tree comprising the location-specific context may comprise a subset of ancestors, and siblings of both the current node and of the ancestors, that are within formatting tags identified within a *FormatTags* dictionary. This context data comprises significantly less data than if the entire DOM tree structure were to be used.

The anchor text may also be combined with neighbouring text, since this may provide a richer collection of descriptive or topical information than the anchor text alone. Text that is formatted with formatting tags and is within a defined close proximity to the anchor text may be used as the neighbouring text.

The different types of interactions may be discovered by a Web crawler visiting Web sites and reading Web-based information resources to identify a set of Web-based resources pointing to the target Web-based resource. A forward index of the form <source_page_ID><target_page_ID><anchor_text> may be formed by parsing the HTML pages. The forward index is sorted on <source_page_ID>. From this forward index, a reverse index is formed that is sorted on <target_page_ID>. The reverse index is of the form <target_page_ID><source_page_ID><anchor_text>. The index building is performed once, and the index can be reused repeatedly unless the repository of Web resources changes. For each target Web page, the <anchor_text> may be extracted from the reverse index. The set of inbound interactions for each Web-based information resource is identified from this collection of anchor text (and possibly neighbouring text, as described above).

A further embodiment of the invention provides a data processing apparatus comprising a data processing unit, a data storage unit, a classifier and program code for generating a representation of a Web-based information resource. The program code for generating a representation is configured to identify anchor text for each of a set of hyperlinks associated with the Web-based information resource, wherein the anchor text for each of the hyperlinks is associated with a node within a DOM tree representing the structure of the Web-based information resource. The program code for generating also determines a location-specific context for each anchor text, by referring to the DOM tree to identify sibling nodes and ancestor nodes for each of the hyperlink anchor texts. This location-specific context comprises text extracted from (r other information relating to) the sibling nodes and ancestor nodes within the DOM tree. The anchor text is then combined with the respective location-specific context for each of the set of hyperlinks, to generate a representation of the Web-based information resource.

The apparatus may include a classifier for using the generated representation to classify the Web-based information resource. The apparatus may include a directory manager configured to add the classified Web-based information resource to a directory.

A directory server system according to a further embodiment of the invention comprises a directory manager program that includes the program code for generating a representation together with the classifier described above. The data storage unit stores a directory of classified Web-page information resources, and the directory manager program is configured to use the representations of items in the directory in response to user requests to retrieve items from the directory.

Methods according to the invention may be implemented using computer program code which controls the performance of operations of a data processing apparatus on which the code executes. The program code may be made available as a program product, comprising program code recorded on a recording medium, or made available for download via a data transfer medium such as via the Internet.

The resulting representation may be used for automated classification of a Web-based information resource, such as when populating a directory. The representation may also be used for improved data retrieval since representations generated using the present invention will typically provide an effective characterization of the Web-page information resource. In this specification, the term 'Web-based information resource' encompasses many resources that are made available via the World Wide Web Internet service, such as a Web site, a document such as a Web page, or a collection of related Web pages (for example, a set of related pages within the same Web site). According to one embodiment of the invention, a common representation format can be used for different types of Web-based information resources such as one or a set of Web pages and Web sites.

BRIEF DESCRIPTION OF DRAWINGS

One or more embodiments of the invention are described below in more detail, by way of example, with reference to the accompanying drawings in which.

DETAILED DESCRIPTION OF EMBODIMENTS

Figure 1:
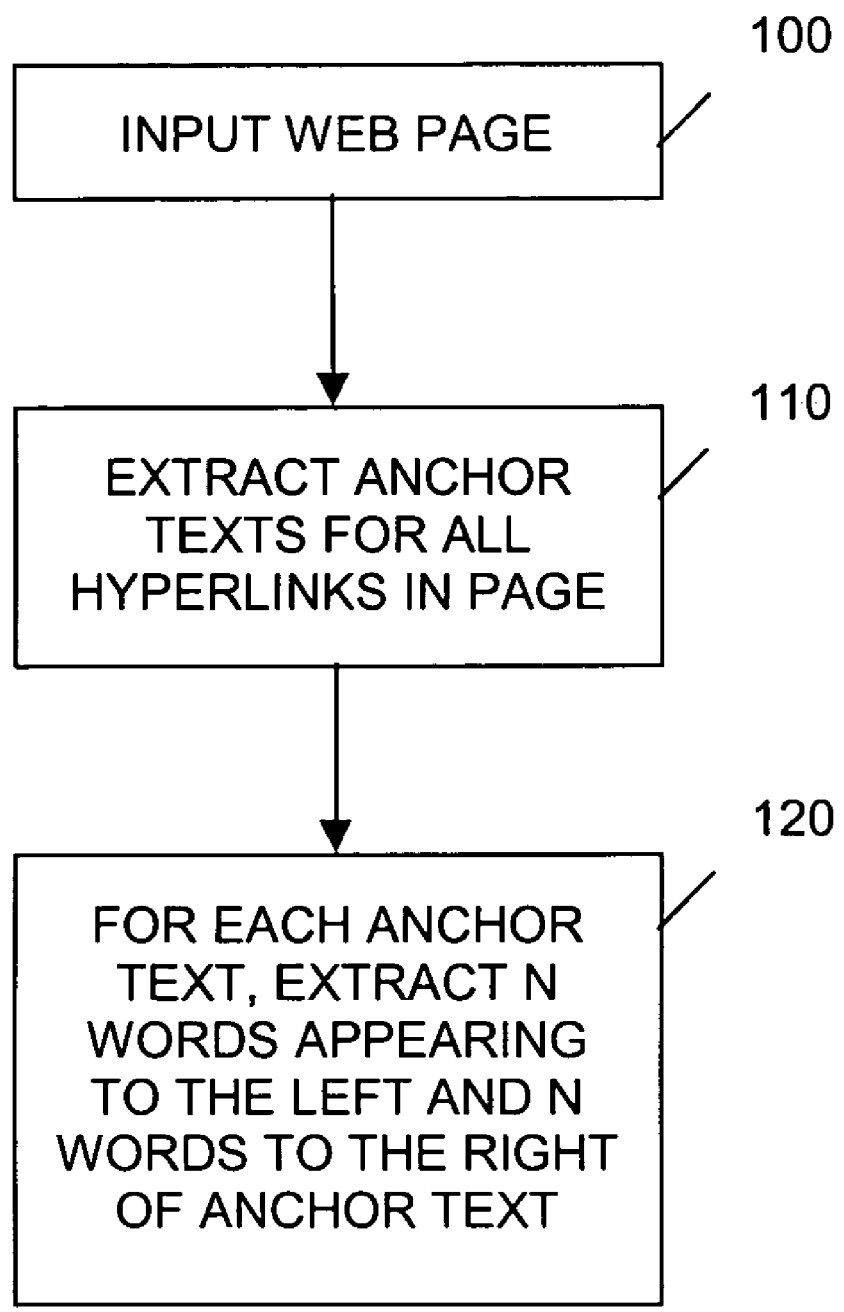
FIG. 1 represents a sequence of steps of a method for extracting anchor text, pre-text and post-text for links within a Web page.

Described below are methods, computer programs and apparatus to determine different types of interactions of Web-based information resources, and to represent Web-based information resources according to their interactions. Also described below is an automated system for classifying and clustering the Web-based information resources using the interaction-based representation.

It will be apparent to a person skilled in the art that individual steps of the methods described below can be performed on a data processing apparatus under the control of computer program code, and that a variety of programming languages and coding implementations may be used to implement the methods and components described herein. Such computer programs are not intended to be limited to the specific example control flows described below, and steps described as if performed sequentially may be performed in parallel (and vice versa). One or more of the operations described in the context of a computer-program-controlled implementation could alternatively be performed by a hardware electronics component.

Some portions of the following description refer to 'algorithms' for performing operations on data within a computer memory. An algorithm is a self-consistent sequence of steps leading to a desired result. The steps are those requiring physical manipulations of physical quantities. Usually, these quantities take the form of electrical or magnetic signals capable of being stored, transferred, combined, compared, and otherwise manipulated. It is frequently convenient to refer to these signals as bits, values, elements, characters, numbers, or the like. It should be borne in mind, however, that the above and similar terms are to be associated with the appropriate physical quantities and are merely convenient labels applied to these quantities. Unless specifically stated otherwise, discussions within the present specification utilising terms such as "computing", "calculating", "determining", "comparing", "generating", "selecting", "outputting", or the like, refer to the action and processes of a computer system, or similar electronic device, that manipulates and transforms data represented as physical (electronic) quantities within the registers and memories of the computer system into other data similarly represented as physical quantities within the computer system memories or registers, or other such information storage, transmission or display devices.

The present specification also discloses apparatus for performing the operations of the methods. Apparatus for implementing the invention may be specially constructed for the required purposes, or may comprise one or more general purpose computers or other devices selectively activated or reconfigured by computer programs stored in the computers or devices. The algorithms and methods described below are not inherently related to any particular computer hardware or other hardware apparatus. Various general purpose machines may be used with programs in accordance with the teachings herein. Alternatively, the construction of more specialised apparatus to perform the required method steps may be appropriate.

In addition, the present specification discloses a computer readable medium for storing a computer program for performing the operations of the methods. The computer readable medium is taken herein to include any transmission medium for communicating the computer program between a source and a destination. The transmission medium may include storage devices such as magnetic or optical disks, memory chips, or other storage devices suitable for interfacing with a general purpose computer. The transmission medium may also include a hard-wired medium such as exemplified by typical Internet-connected server computers, or a wireless medium such as exemplified in the GSM mobile telephone system.

Where steps or features in any of the accompanying drawings are referenced by the same reference numerals, those steps and/or features have the same or similar functions or operations in the context of the present description (unless the contrary intention appears).

Various Web document representations based on different features have been suggested and used for machine learning tasks such as clustering and classification. A simple document representation treats the document as a text document, ignoring all tag information present in a Web resource. This "text content representation" of a Web document results in low accuracy for clustering and classification of Web documents. Further, this representation can only yield topical clustering and classification of Web documents. As an example, the content representation of Web documents can be used to devise a classifier which correctly classifies sites related to sports. However, it is not possible to devise a classifier to classify sites into media sites and non-media sites based on the content representation of Web documents. The reason for this difference is that while a class such as "Sports" is separable based on the words/phrases that occur in the text content, a "Media" class is not separable based on the words occurring in the text content. The Media class covers several topics and therefore does not have a topic-specific vocabulary. An alternative representation of Web-based information resources is required for classification into classes, such as Media, that are not separable by their text content.

Described below is a method to characterize a given Web-based information resource based on its interactions with other Web-based information resources. A Web-based information resource could be a single Web document, a Web site, or a collection of related Web documents. An important difference between a Web document and a text document is the presence of hyperlinks by which a Web document connects to other related documents, or other points within the same document. A hyperlink between two documents represents an association and a potential interaction between the two documents. The association (or 'potential interaction') defined by a hyperlink is referred to herein as an 'interaction'. Characteristics of the link including its context and associated text may be used to define a set of interactions characterizing a Web-based information resource.

Anchor text associated with each link should, ideally, indicate the topic of the connected document. As an example, a document which connects to the Cable News Network's (CNN's) home page 'www.cnn.com' may have "cnn.com" as the anchor text, but text such as "cnn.com" does not carry topical information. One solution is to include the neighbouring text of the anchor text as part of the data captured for an interaction. This provides richer interaction data. Additionally, use may be made of the context in which the anchor text appears in the document, based on the document structure. The anchor text, neighboring text and context together characterize the interaction corresponding to a link.

Three different types of interactions are defined. An inbound interaction is caused by an inbound link to a Web-based information resource from another resource. An outbound interaction is caused by an outbound link from the Web-based information resource to another resource. An internal interaction is caused by an internal link within a Web-based information resource.

Described below are methods to compute these interactions, and a method to represent a Web-based information resource based on these interactions. The representation can be used for various machine learning tasks such clustering and classification.

Web-based Information Resources

Most known methods for classification and clustering of Web pages operate on individual Web pages. Manually created directories such as Yahoo!™ and dmoz on the other hand categorize Web sites. Representation of Web-based information resources at the site level is needed in order to classify and cluster them. The following is a formal definition of a Web-based information resource that can be used for Web page classification as well as Web site classification.

A Web-based information resource R is a set of Web pages $\{p_1, p_2, \ldots, p_n\}$ where $n \geq 1$. The pages are either from the same site or related in some way—such as semantically related. According to this definition, a single page $p_i$ is also a Web-based information resource. A Web site can be represented by all the pages which appear at the site. In this case, $R_{SITE} = \{p_1, p_2, \ldots, p_m\}$ where the Web site 'SITE' contains m Web pages. Some Web sites contain hundreds of thousands of pages and thus a representation of a Web site that includes all the pages in the site could be huge. Such a representation may include several pages that are not representative of the site ('noisy' pages) and this would decrease the classification and clustering accuracy. Some selection criteria could be used to prune unnecessary pages from the representation of the Web site. The selection could be based, for example, on the importance of a Web page. This importance could be quantified in several ways, but a first example is to use the number of "inbound links" to the page. In another representation, entry pages to a site, or to sections of the site, may be identified and only those pages used in the representation of the Web site.

Representing a Web-based Information Resource

A typical Web-based information resource contains several hyperlinks and thus differs from a simple text document. The various interactions defined by these hyperlinks are used for characterizing a Web-based information resource.

Let $l(s,r)$ denote a hyperlink from the Web-based information resource $R_s$ to the resource $R_r$. $R_s$ is called the source Web-based information resource and $R_r$ is called the receiver Web-based information resource. Although the actual hyperlinks exist between individual Web pages, either or both of $R_r$ and $R_s$ may be Web sites, collections of pages, or other specific documents. A link $l(s,r)$ exists between resource $R_s$ and $R_r$ iff $\exists x \in R_s$ and $y \in R_r$ such that Web page x has a link to Web page y.

A link between two Web-based information resources typically captures some information about the receiver Web-based information resource. In particular, the anchor text which appears along with the link denotes a remark about the receiver Web-based information resource. However, in some cases, anchor text alone may not be sufficient to capture topical information about the receiver Web-based information resource. As an example, if the receiver Web-based information resource is the cnn.com Web site, then the anchor text associated with a hyperlink to the site may be "cnn.com" which does not capture any topical information about the cnn.com site.

Typically, text appearing before the anchor text as well as text appearing after the anchor text provides some information about the receiver Web-based information resource, and so a combination of the anchor text and a set of neighbouring words will, in many cases, capture relevant topical information. As shown in FIG. 1, a window of 2N words is used to capture this information. A set of Web pages are input 100 for analysis. Anchor texts are extracted 110 from each page for each hyperlink within the page. The N words appearing before the anchor text are referred to as the pretext that is assumed to include information relevant to the linked resource, and the N words appearing after the anchor text are referred to as a posttext that is also assumed to include relevant information. The pretext and posttext are both extracted 120 and form neighbouring words associated with the anchor text.

In another embodiment, the selected set of neighbouring words comprises only a subset of words within the set of 2N neighbouring words. The subset comprises words formatted within format tags. The inventors of the present invention have determined that such a representation may be more reliable than if both formatted and unformatted words are considered—since formatted text is often more reliably descriptive of the topic of a linked-to resource than the unformatted text.

Besides pretext, anchor text and posttext, the present embodiment also captures a location-specific context in which the link appears on the source Web-based information resource. This is described below with reference to FIGS. 2 and 3. In particular, the context for each link's anchor text is determined by reference to the nesting of HTML tags within the Web-based information resource. The structure is represented in a tree form known as the DOM (Document Object Model) tree. The anchor text associated with a hyperlink is one of the nodes within the DOM tree. Most anchor text nodes of the tree have one or more ancestor nodes and one or more sibling nodes within the DOM tree. Text associated with a subset of an anchor text's sibling and ancestor nodes is extracted for use as a location-specific context for each hyperlink. In particular, the location-specific context for each hyperlink anchor text is determined by identifying and extracting formatted words to the left and above the hyperlink anchor text in the DOM tree. The text of previous siblings and ancestors within format tags have been found by the inventors of the present invention to be more reliably descriptive of a linked-to resource than plain text. The various HTML tags have different purposes—only some HTML tags being used for formatting the text. A list containing some common formatting HTML tags is given in Table 1 below.

TABLE 1

Example Formatting HTML Tags

| Tag Description | HTML tags |
|---|---|
| Heading 1 . . . Heading 6 | <H1> . . . <H6> |
| Strong | <STRONG> |
| Bold | <B> |
| Italicized | <I> |
| Emphasis | <EM> |
| Title | <TITLE> |
| Underline | <U> |

The set of all the formatting HTML tags is represented by FormatTags. While the above list includes only a subset of known FormatTags, the FormatTags nevertheless provide a relatively small tag dictionary for efficient identification of a location-specific context.

Each tag-delimited item of text within a Web page (including hyperlink anchor text) is represented by a node in the corresponding DOM tree. However, only some text items, depending on their location in the Web page and therefore in the DOM tree, are used to form the location-specific context for a given anchor text. For example, let us consider an anchor text "CNN News site" for a hyperlink pointing to Website "www.cnn.com", under a heading "My favourite news sites" (delimited by tags H1, H2) in page entitled "Media pages". The anchor text node in the DOM tree contains the text "CNN News site", the heading node contains the text "My favourite news sites" and the title node contains "Media pages". All of these text items may be included in the location-specific context of the anchor text pointing to the Website homepage "www.cnn.com".

Figure 2:
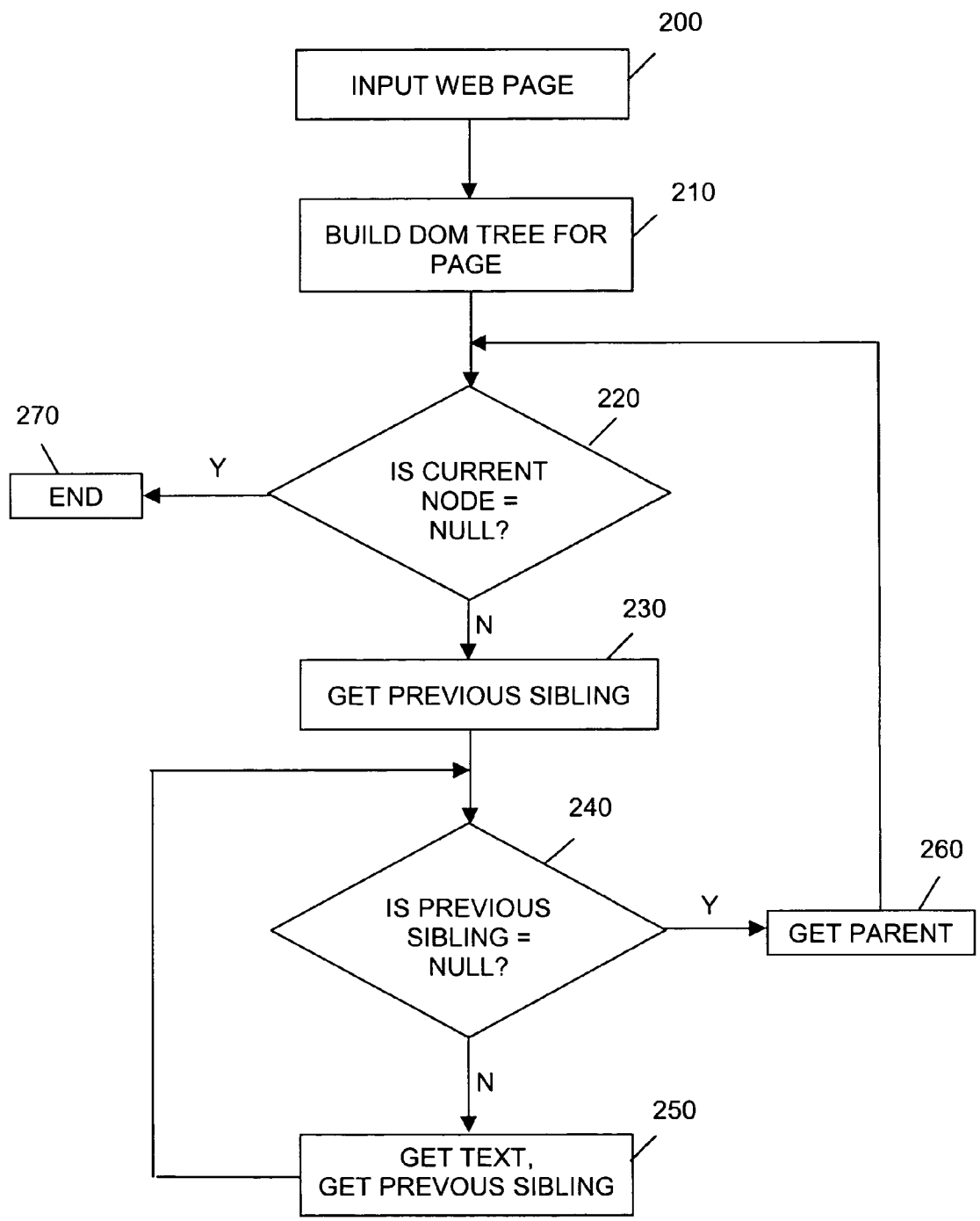
FIG. 2 represents steps of a method for extracting location-specific context information associated with the anchor text of a hyperlink.

Described below are example algorithms Algorithm1 and Algorithm2 that may be implemented (for example in computer program code) to determine a location-specific context for anchor text corresponding to a current node in the DOM tree. FIG. 2 shows the steps of a method for identifying and extracting the siblings and ancestors of an anchor text node. The operations represented in FIG. 2 traverse the DOM tree to find the current node's siblings and ancestors. These siblings and ancestors may form the location-specific context of the anchor text node.

Referring to FIG. 2, when a Web page is input 200 to start the process, the HTML of the page is parsed to identify the tag structure of the page and the DOM tree is built 210. For each anchor text node in the DOM tree, an operation is performed 230 to get the previous sibling. Unless there is no previous sibling (as determined at step 240), the text of the previous sibling is extracted 250 and then the next previous sibling is obtained. If step 240 determines that there is no previous sibling, the process attempts to obtain the parent node 260 and the sequence iterates to obtain siblings of the parent node. When the parent node is null, the process is complete and the location-specific context is output 270.

Figure 3:
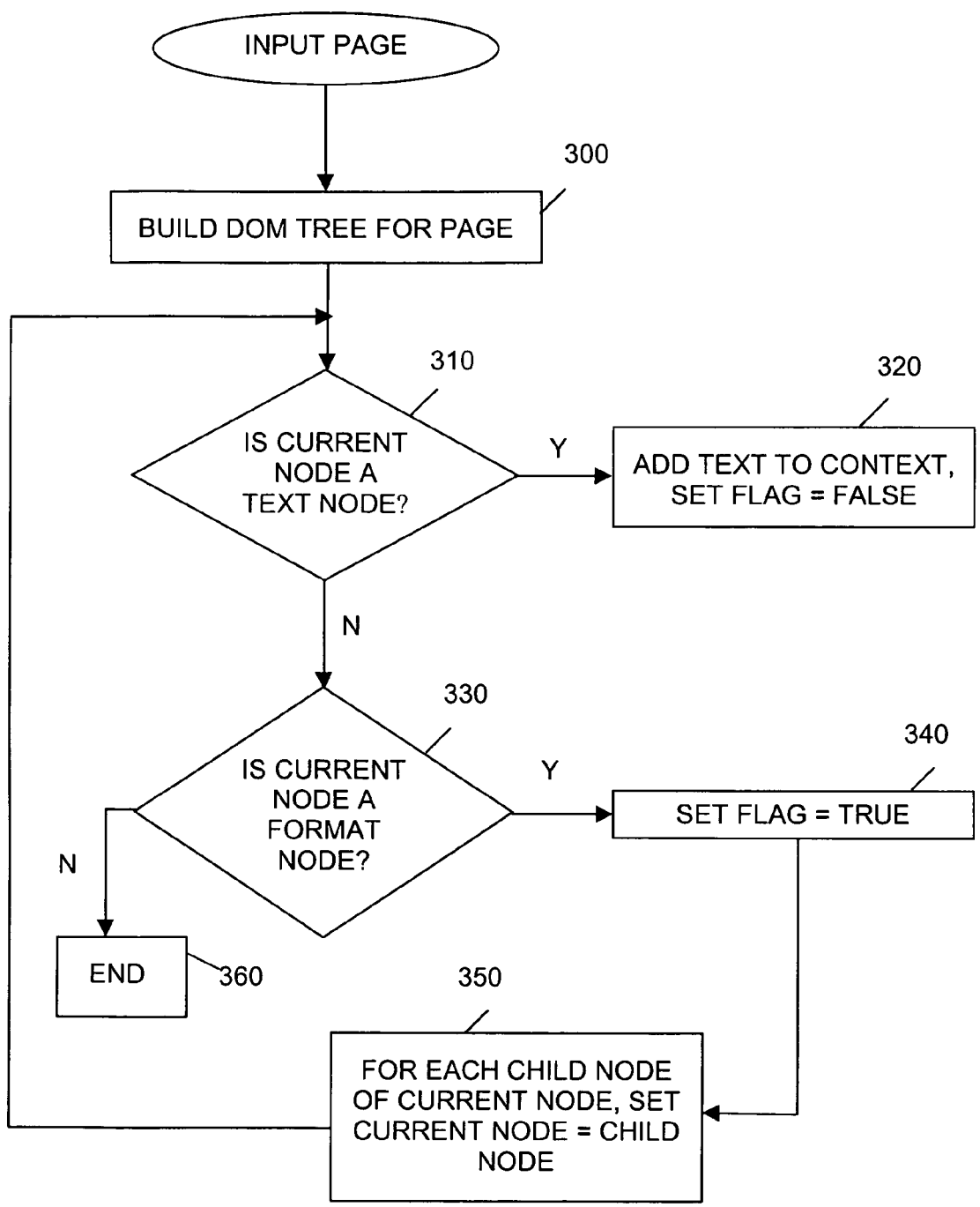
FIG. 3 represents steps of a method for extracting text blocks under formatting nodes.

The operations performed by a module for extracting text from a node (step 250 of FIG. 2) are shown in FIG. 3. An input HTML page is parsed 300 to build the DOM tree. A determination is performed 310 of whether a current node is a text node. If the current node is text node, the text (node value) is added 320 to the context and the format flag is set to false. If the current node is not a text node, a check is performed 330 of whether the current node is a formatting node (i.e. is within the dictionary of format tags). If the node is a formatting node, the format flag is set 340 to true and then the child nodes of the current node are extracted 350. If neither a text node nor a format node, the process ends 360. For each of the child nodes, the process steps 320-350 are repeated by setting a child node as the current node, for each child node in turn.

Algorithms corresponding to the steps shown in FIGS. 2 and 3 are set out below.

Algorithm 1: To Find Context for a Link:

```
Function findContext(node, context)
    current_node = node
    While (current_node != null)
        temp1 = current_node.getPreviousSibling( )
        While(temp1 != null)
            getText(temp1, context, false)
            temp1 = temp1.getPreviousSibling( )
        current_node = current_node.getParent( )
```

The function findContext( ) within the above Algorithm 1 is invoked to determine the context of a given link in a page, with a node and context as arguments. The variable node represents the anchor text node in the DOM tree for which we want to determine the context. Initially, node is assigned to current_node. Iteratively, for all siblings of node that are formatted within format tags, the getText( ) function is called to update the value of context. The function getPreviousSibling( ) returns the sibling to the left of the current node in the DOM tree. If the next sibling is null, the process steps to the parent of the current node and repeats the same getText( ) operation. The function getParent( ) returns the parent of the current node in the DOM tree. The process iterates for siblings of the parent, and so on for ancestors of the parent until the root of the DOM tree is reached.

Thus, the function findContext( ) traverses the DOM tree from the anchor text node and determines the nearest text formatted with FormatTags in the sibling nodes to the left of the anchor text node, and then sibling nodes to the left of the anchor text node's parent node, and so on until the root node of the DOM tree is reached. This root typically corresponds to the top of a Web page.

Thus, the process extracts the text within formatted tags that appears above and before the anchor text (up to the top of the Web page). This location-specific context is combined with the anchor text and neighbouring text to obtain a rich representation of a Web-based information resource. To extract the location-specific context, we use the DOM tree of the HTML page. The previous siblings and ancestor nodes of the anchor text node in the DOM tree give the formatted text which appears above/before the target anchor text in the HTML document.

The following example algorithm may be implemented (for example in computer program code) to find formatted text under a node:

Algorithm 2: To Find Formatted Text for a Node

```
Function getText(node, context, flag)
    if(node.Type == Text_Node) AND (flag)
        context += node.value( )
        flag = false
    else
        if (node.Type in FormatTags)
            flag = true
        for (node1 in node.children( ))
            getText(node1, context, flag)
    return
```

The function getText( ) within Algorithm 2 above uses the set FormatTags and collects the formatted text under a given node. The function value( ) returns the text content associated with the node. Conceptually, the function findcontext( ) collates the text tagged inside the FormatTags. The algorithm starts with the anchor text node as the current node and then considers the nearest sibling node to the left of the current node that contains text tagged inside FormatTags. The algorithm updates the current node to the parent of the current node and then iterates over the current node again (as described previously). The function findcontext( ) thus collates the formatted tags until the root node of the DOM tree becomes the current node.

Variations to the function findContext( ) are possible. For example, the sibling or previous parent comprising formatted text nearest to an anchor text may be used as the only context.

In another variation, the natural ordering of HTML tags is taken into account, and the nearest formatted text for each HTML tag is used as context.

For a given link, the anchortext, pretext, posttext and the location-specific context are defined as the interaction formed by the link. Let I(s,r) denote the interaction corresponding to the link l(s,r) where s represents the source node and r represents the receiver node.

Based on the role played by the Web-based information resource in the interaction, an interaction can be classified into one of the three types. An inbound interaction for a current Web-based information resource $R_c$ is an interaction of the form I(*,c); where '*' represents any Web-based information resource other than $R_c$. In other words, inbound interactions for a Web-based information resource $R_c$ are those interactions in which the Web-based information resource $R_c$ acts as a receiver and the source is never $R_c$. The collection of all the inbound interactions for a current Web-based information resource may be considered as denoting how all other Web resources refer to the current Web-based information resource (in other words, denoting the 'image' of the Web-based information resource to the outside world).

As an example, the collection of all inbound interaction for the Website "www.cnn.com" may contain phrases such as "news", "International News", "Media", and "News journals," which are representative of the image the world has about the "cnn.com" Website.

An outbound interaction of a current Web-based information resource $R_c$ is of the form I(c, *) where * is not c. That is, the Web-based information resource $R_c$ acts as a source and the receiver is never $R_c$. The collection of all the outbound interactions of a current Web-based information resource will include information regarding the type of interactions the current resource has with other Web-based information resources. As an example, a travel site may interact with an airline site or a hotel reservation site and correspondingly may contain words such as airline reservations and hotel bookings.

An internal interaction is of the form I(c,c), where the current Web-based information resource is both the source and the receiver. Internal interactions are caused by all the internal links within the Web resource (links to other locations within a page or, in the case of a Web-based information resource that is a Website, links to other pages within the site). The collection of all the internal interactions includes information regarding the type of information that the particular Web resource presents about itself. As an example, a typical educational institution's Website will contain internal links to specific faculties, courses and admissions pages.

Representing a Web-based Information Resource by its Interactions

For a given a Web-based information resource $R_d$, let the set $L_{in}=\{l_1, \ldots l_m\}$ contain all links for which the Web resource $R_d$ acts as a receiver. Note that Web-based information resource $R_d$ does not act as a source in any link in the set $L_{in}$. For each link $l_i$, $1 \leq i \leq m$, the interaction associated with the link is computed as described above. All the interactions associated with links in $L_{in}$ together form the set of inbound interactions for the document, denoted by $d_{in}$.

Let the set $L_{local}=\{l_1, \ldots l_k\}$ denote all links that appear in the documents belonging to Web-based information resource $R_d$ for which the receiver resource associated with the links also belongs to Web-based information resource $R_d$. The interactions associated with all the links in the set $L_{local}$ together form the set of internal interactions, denoted by $d_{local}$ for Web resource $R_d$.

Let the set $L_{out}=\{l_1, \ldots l_n\}$ denote all links that appear in the documents belonging to Web-based information resource $R_d$ in which the receiver Web-based information resource is never $R_d$. The interactions associated with all links in $L_{out}$ together form the set of outbound interactions denoted by $d_{out}$.

For a Web-based information resource $R_d$, the inbound interactions, internal interactions and outbound interactions together form the overall set of interactions of Web-based information resource $R_d$ and is denoted by interaction. A word w which appears within an inbound interaction is treated differently from the same word w which appears as part of an internal interaction or as the part of an outbound interaction.

Let $D=\{R_{d1}, \ldots, R_{dp}\}$ be the collection of p Web-based information resources. All receiver Web-based information resources as well as source Web-based information resources for all links appearing in the documents are included in the collection D.

A set I={interaction$_1$, . . ., interaction$_p$} is constructed where interaction$_i$ represents the overall set of interactions for the Web resource $R_{di}$. Let the Dict={$w_1, \ldots, w_N$} be the dictionary formed by collating all the words appearing in these interactions. Note, that a word w which appears in an internal interaction is treated differently from the word w which appears in an inbound or an outbound interaction. This can be achieved by augmenting each word which appears in an inbound interaction with an "in" suffix. Similarly, other labels can be associated with words from other interactions. As an example a word w can be represented by w_in for all its appearances in inbound interactions whereas w can be represented by w_out or w_local for all its appearances in outbound interactions and internal interactions, respectively.

Now, a Web-based information resource $R_{dj}$ can be represented as an N bit vector $d_j=\{w_1, \ldots, w_N\}$, where $w_i=0$; $1 \leq i \leq N$, if the word $w_i$ does not appear in interaction$_j$ for Web-based information resource $R_{dj}$ or else $w_i=1$.

Alternatively, Let $f_j(w_i)$ denote the frequency of occurrence of word $w_i$ in Web-based information resource $R_{dj}$, and let $f_{max}=\max_{ij}f_j(p_i)$. Now Web-based information resource $R_{dj}$ can be represented as an N-dimensional vector $d_j=[d_{j1}, d_{j2}, \ldots, d_{jN}]$, where $d_{jk}=f_j(p_k)/f_{max}$, $1 \leq k \leq N$.

This Web-based information resource representation can be used in several applications such as classification and clustering. Traditional similarity measures such as the Euclidean measure or cosine similarity measure can be used to compute the similarity between two Web-based information resources.

Figure 4:
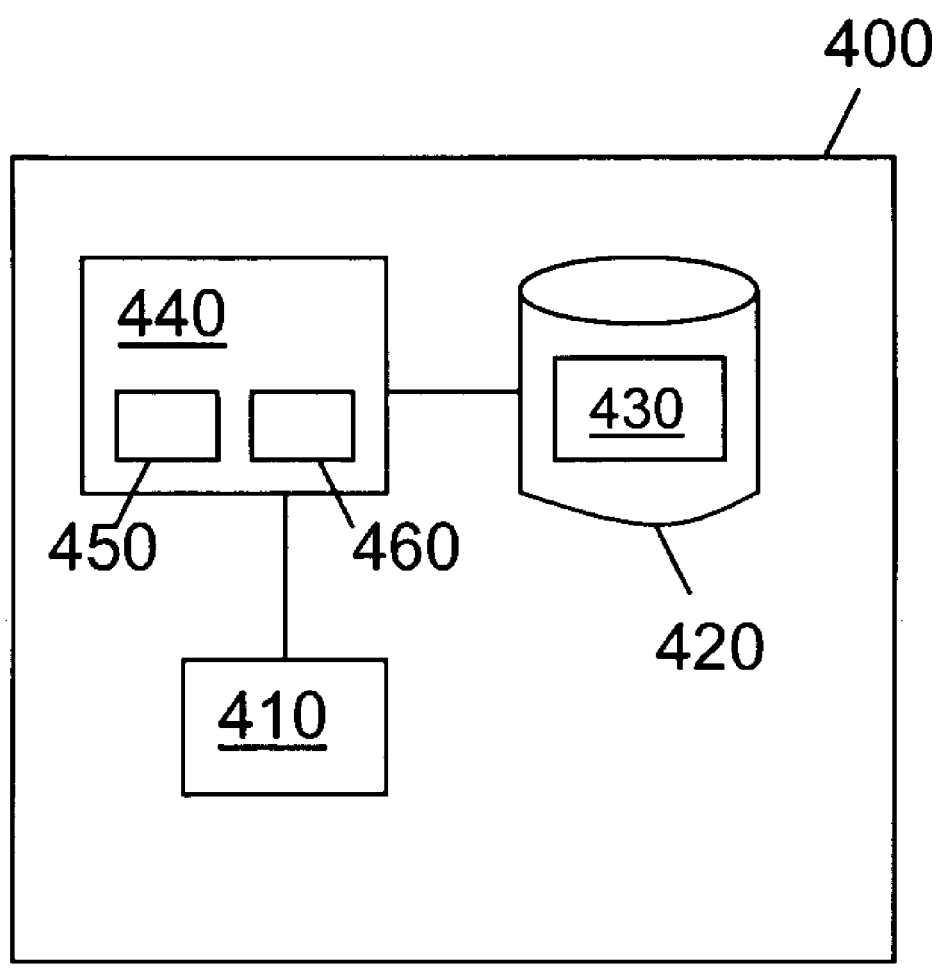
FIG. 4 is a schematic representation of a directory server system in which the present invention may be implemented.

FIG. 4 is a schematic representation of a directory server computer 400 according to an embodiment of the invention. The directory server comprises a data processing unit 410 and a data storage unit 420 for storing the directory 430. The directory is a database of Web page URLs pointing to (i.e. identifying and locating) individual Web pages on the Internet. A directory manager program 440 running on the directory server computer 400 includes a representation generator 450. The representation generator is used to control the data processing unit to generate a representation of individual Web pages, as well as representations of Web sites and of other collections of related Web pages. The generation method is described above. The generated representations are then used by a classifier 460 within the directory manager program 440 to use the generated representations to automatically populate the directory 430 with references to Web-information resources.

EXAMPLE APPLICATION

Source Categorization

An important issue for the Web is the verification of the accuracy, currency and authenticity of the information associated with Web resources. A possible way to address this problem is to identify the source or sponsor of each Web resource. For example, if the source is a government organization, the information may be more reliable than if it is an obscure political organization. However, source identification is non-trivial because the source of a Web resource cannot always be determined by the content of the resource. For example, a news resource and a commercial travel resource might be addressing the same topic. It can be important to differentiate between topical categorization of Web resources and source categorization. Topical categorization is aimed at classifying Web resources based on their topical content and has been studied extensively in the art. In contrast, the problem of source categorization may be defined as determining the nature of the source of a resource.

The representation described above may be used for source categorization. A problem of source categorization is how to assign one of a set of predetermined source categories to every source of information on the Web. The exact number and nature of the different categories of sources depends on the application at hand.

For the task of source categorization, some example source categories and a set of web resources for each of the categories are input to the system. These resources are represented using pretext, posttext and context information as described above. A standard and well known document classification technique may be used on the generated representation of example Web resources to build a classification model. The model can then be used to identify source categories for unclassified web resources.

What is claimed is:

1. A method for generating a representation of a Web-site comprising a plurality of Web-pages, said method comprising:
   identifying a set of hyperlinks associated with a first Web-site comprising a plurality of first Web-pages, wherein said identifying comprises searching for hyperlinks corresponding to a plurality of different types of interaction with said first Web-site, wherein said searching comprises searching for inbound hyperlinks to said first Web-site from Web-pages other than said first Web-pages, outbound hyperlinks from said first Web-site to a Web-site other than said first Web-site, and internal hyperlinks linking a plurality of said Web-pages within said first Web-site;
   identifying anchor text for each of the identified set of hyperlinks associated with said first Web-site, wherein said anchor text for each of the hyperlinks is associated with a node within a DOM tree that represents a structure of said Web-site, wherein said anchor text comprises a subset of words within neighboring nodes of said node within said DOM tree, and wherein said subset comprises words formatted within format tags;
   determining a location-specific context for each of the anchor texts, wherein said location-specific context comprises a location above and before said anchor text up to a root node of said DOM tree, wherein said root node of said DOM tree corresponds to a top of a particular Web page; and
   combining said anchor text with a respective location-specific context for each of said set of hyperlinks, to generate a representation of said first Web-site.

2. The method according to claim 1, wherein said searching comprises a Web crawler visiting a plurality of Web sites and parsing a plurality of Web-sites to identify a set of Web-sites having hyperlinks pointing to said first Web-site.

3. A data processing apparatus comprising:
   a data processing unit;
   a data storage unit; and
   program code for generating a representation of a Web-site comprising a plurality of Web-pages, wherein said program code is configured to:
     identify a set of hyperlinks associated with a first Web-site comprising a plurality of first Web-pages, wherein said identifying comprises searching for hyperlinks corresponding to a plurality of different types of interaction with said first Web-site, wherein said searching comprises searching for inbound hyperlinks to said first Web-site from a Web-pages other than said first Web-pages, outbound hyperlinks from said first Web-site to a Web-site other than said first Web-site, and internal hyperlinks linking a plurality of said Web-pages within said first Web-site;
     identify anchor text for each of the identified set of hyperlinks associated with said first Web-site, wherein said anchor text for each of the hyperlinks is associated with a node within a DOM tree that represents a structure of said Web-site, wherein said anchor text comprises a subset of words within neighboring nodes of said node within said DOM tree, and wherein said subset comprises words formatted within format tags;
     determine a location-specific context for each of the anchor texts, wherein said location-specific context comprises a location above and before said anchor text up to a root node of said DOM tree, wherein said root node of said DOM tree corresponds to a top of a particular Web page; and
     combine said anchor text with a respective location-specific context for each of said set of hyperlinks, to generate a representation of said first Web-site.

4. A method for generating a representation of a Web-site comprising a plurality of Web-pages, said method comprising:
   identifying anchor text for each of a set of hyperlinks associated with said Web-site, wherein said set of hyperlinks consists of inbound hyperlinks to said Web-site from another Web-site other than said Web-site, outbound hyperlinks from said Web-site to another Web-site other than said Web-site, and internal hyperlinks linking a plurality of said Web-pages within said Web-site, wherein said anchor text for each of the hyperlinks is associated with a node within a DOM tree that represents a structure of said Web-site, wherein said anchor text comprises a subset of words within neighboring nodes of said node within said DOM tree, and wherein said subset comprises words formatted within format tags;
   referring to said DOM tree to identify a set of related nodes within said DOM tree for each hyperlink anchor text, and determining a location-specific context for each anchor text, wherein said context comprises information relating to said set of related nodes within said DOM tree, wherein said location-specific context comprises a location above and before said anchor text up to a root node of said DOM tree, wherein said root node of said DOM tree corresponds to a top of a particular Web page; and combining said anchor text with a respective location-specific context for each of said set of hyperlinks, to generate a representation of said Web-site.

5. The method according to claim 4, wherein said location-specific context for each hyperlink comprises text extracted from set a of sibling nodes and ancestor nodes of at least one of a respective anchor text within said DOM tree.

6. The method according to claim 5, wherein said location-specific context comprises text extracted from previous sibling nodes of each anchor text and text extracted from said ancestor nodes of said anchor text and from previous siblings of said ancestor nodes within said DOM tree.

7. The method according to claim 4, wherein said set of hyperlinks associated with said Web-site comprises internal hyperlinks linking a plurality of DOM tree nodes within said Web-site.

8. The method according to claim 4, further comprising combining said anchor text and said respective location-specific context with additional text within said Web-site having a predefined proximity relationship to said anchor text, for each of the set of hyperlinks.

9. The method according to claim 8, wherein said predefined proximity relationship comprises both text before said anchor text and text following said anchor text within said DOM tree.

10. The method according to claim 4, further comprising identifying text within format tags in said Web-site, wherein said text comprises a predefined proximity relationship to said anchor text, and combining said anchor text and said respective location-specific context with the identified text, for each of the set of hyperlinks.

11. The method according to claim 4, wherein said Web-site comprises a set of associated Web pages.

12. The method according to claim 4, incorporated herein by reference, wherein said Web-site comprises a Web site.

13. The method according to claim 4, further comprising:
inputting a generated representation of said Web-site to an automated classifier;

processing said generated representation using said automated classifier to determine a Web directory location for inserting a reference to said Web-site; and
adding said reference to said Web directory location.

14. A data processing apparatus comprising:
a data processing unit;
a data storage unit; and
program code for generating a representation of a Web-site, wherein said program code is configured to:
identify anchor text for each of a set of hyperlinks associated with said Web-site, wherein said set of hyperlinks consists of inbound hyperlinks to said Web-site from another Web-site other than said Web-site, outbound hyperlinks from said Web-site to another Web-site other than said Web-site, and internal hyperlinks linking a plurality of said Web-pages within said Web-site, wherein said anchor text for each of the hyperlinks is associated with a node within a DOM tree representing a structure of said Web-site, wherein said anchor text comprises a subset of words within neighboring nodes of said node within said DOM tree, and wherein said subset comprises words formatted within format tags;
refer to said DOM tree to identify nodes related to an anchor text node for each of said hyperlinks, to determine a location-specific context for each anchor text, wherein said context comprises information relating to said related nodes within said DOM tree, wherein said location-specific context comprises a location above and before said anchor text up to a root node of said DOM tree, wherein said root node of said DOM tree corresponds to a top of a particular Web page; and
combine said anchor text with a respective location-specific context for each of said set of hyperlinks, to generate a representation of said Web-site.

15. The data processing apparatus according to claim 14, further comprising a classifier for using a generated representation of said Web-site to classify said Web-site.

16. The data processing apparatus according to claim 15, further comprising a directory manager configured to add the classified Web-site to a directory.

* * * * *